(12) United States Patent
Sankaranarayanan et al.

(10) Patent No.: US 11,178,349 B2
(45) Date of Patent: Nov. 16, 2021

(54) LENSLESS IMAGING SYSTEM USING AN IMAGE SENSOR WITH ONE OR MORE ATTENUATING LAYERS

(71) Applicant: William Marsh Rice University, Houston, TX (US)

(72) Inventors: Aswin Sankaranarayanan, Houston, TX (US); Ashok Veeraraghavan, Houston, TX (US); Lisa A. Hendricks, Houston, TX (US); Richard Baraniuk, Houston, TX (US); Ali Ayremlou, Houston, TX (US); M. Salman Asif, Houston, TX (US)

(73) Assignee: William Marsh Rice University, Houston, TX (US)

( * ) Notice: Subject to any disclaimer, the term of this patent is extended or adjusted under 35 U.S.C. 154(b) by 0 days.

(21) Appl. No.: 15/547,235

(22) PCT Filed: Jan. 29, 2016

(86) PCT No.: PCT/US2016/015734
§ 371 (c)(1),
(2) Date: Jul. 28, 2017

(87) PCT Pub. No.: WO2016/123529
PCT Pub. Date: Aug. 4, 2016

(65) Prior Publication Data
US 2018/0027201 A1   Jan. 25, 2018

Related U.S. Application Data

(60) Provisional application No. 62/109,358, filed on Jan. 29, 2015.

(51) Int. Cl.
*G02B 27/42* (2006.01)
*H04N 5/378* (2011.01)
(Continued)

(52) U.S. Cl.
CPC ............ *H04N 5/378* (2013.01); *G01T 1/295* (2013.01); *G02B 27/42* (2013.01); *H04N 5/225* (2013.01); *H04N 5/30* (2013.01); *G02B 2207/129* (2013.01)

(58) Field of Classification Search
CPC ........................ G02B 2207/129; G01T 1/295
See application file for complete search history.

(56) References Cited

U.S. PATENT DOCUMENTS 4,991,020 A   2/1991 Zwirn
10,753,869 B2 *  8/2020 Veeraraghavan ...... G02B 21/16
(Continued)

FOREIGN PATENT DOCUMENTS

GB   2 434 934 A   8/2007
JP   2008-527944 A   7/2008
(Continued)

OTHER PUBLICATIONS

Office Action issued in corresponding Japanese Application No. 2017-540643 dated Jun. 19, 2018, and English translation thereof (31 pages).
(Continued)

*Primary Examiner* — Twyler L Haskins
*Assistant Examiner* — Wesley J Chiu
(74) *Attorney, Agent, or Firm* — Osha Bergman Watanabe & Burton LLP

(57) ABSTRACT

A lens-free imaging system for generating an image of a scene includes an electromagnetic (EM) radiation sensor; a mask disposed between the EM radiation sensor and the scene; an image processor that obtains signals from the EM radiation sensor while the EM radiation sensor is exposed to the scene; and estimates the image of the scene based on, at least in part, the signals and a transfer function between the scene and the EM radiation sensor.

23 Claims, 13 Drawing Sheets

(51) Int. Cl.
*H04N 5/30* (2006.01)
*H04N 5/225* (2006.01)
*G01T 1/29* (2006.01)

(56) References Cited

U.S. PATENT DOCUMENTS

| | | | | |
|---|---|---|---|---|
| 2006/0157640 | A1* | 7/2006 | Perlman | H04N 5/2254 250/208.1 |
| 2009/0095912 | A1* | 4/2009 | Slinger | G01T 1/295 250/363.06 |
| 2010/0321501 | A1 | 12/2010 | Arndt | |
| 2011/0026141 | A1* | 2/2011 | Barrows | H01L 31/1876 359/737 |
| 2011/0085051 | A1* | 4/2011 | Chi | H04N 5/2254 348/222.1 |
| 2011/0204209 | A1* | 8/2011 | Barrows | G02B 27/58 250/208.1 |
| 2012/0062760 | A1 | 3/2012 | Klapp et al. | |
| 2012/0268574 | A1* | 10/2012 | Gidon | H04N 9/04557 348/49 |
| 2013/0043375 | A1* | 2/2013 | Baleine | G11C 13/0004 250/237 R |
| 2013/0113921 | A1* | 5/2013 | Richards | G02B 27/46 348/135 |
| 2014/0184754 | A1* | 7/2014 | Suh | H04N 13/232 348/50 |
| 2014/0301535 | A1* | 10/2014 | Williams | G01N 23/20066 378/87 |
| 2015/0139560 | A1* | 5/2015 | DeWeert | H04N 19/42 382/233 |
| 2015/0215529 | A1* | 7/2015 | Wang | G06K 9/6244 348/218.1 |
| 2015/0293018 | A1* | 10/2015 | Stork | G02B 5/1871 250/550 |
| 2015/0381958 | A1* | 12/2015 | Zalevsky | G02B 26/06 250/354.1 |
| 2016/0003994 | A1* | 1/2016 | Gill | H01L 27/14625 348/218.1 |
| 2016/0065824 | A1* | 3/2016 | Geng | H04N 5/2355 348/222.1 |
| 2016/0169667 | A1* | 6/2016 | Stork | G02B 27/4255 356/496 |

FOREIGN PATENT DOCUMENTS

| | | |
|---|---|---|
| JP | 2008-191661 A | 8/2008 |
| JP | 2008-542863 A | 11/2008 |
| JP | 2009-522825 A | 6/2009 |
| JP | 2009-529160 A | 8/2009 |
| JP | 2010-177918 A | 8/2010 |
| JP | 2012-23498 A | 2/2012 |
| WO | 2006/125975 A1 | 11/2006 |
| WO | 2007/091051 A1 | 8/2007 |

OTHER PUBLICATIONS

International Search Report issued in PCT/US2016/015734 dated Jul. 5, 2016 (3 pages).
Written Opinion of the International Searching Authority issued in PCT/US2016/015734 dated Jul. 5, 2016 (8 pages).
Cannon, T.M. et al.; "Coded aperture imaging: many holes make light work"; Optical Engineering, vol. 19, No. 3, May 1, 1980, pp. 283-289 (4 pages).
Busboom, A. et al.; "Uniformly Redundant Arrays"; Experimental Astronomy, vol. 8, Jun. 1, 1998, pp. 97-123 (27 pages).
First Examination Report issued in corresponding IN Application No. 201727030079 dated Sep. 30, 2019 (5 pages).

* cited by examiner

LENSLESS IMAGING SYSTEM USING AN IMAGE SENSOR WITH ONE OR MORE ATTENUATING LAYERS

STATEMENT REGARDING FEDERALLY SPONSORED RESEARCH OR DEVELOPMENT

The invention was made with government support under Grant Number CCF-1117939 awarded by the National Science Foundation. The invention was made with government support under Grant Number HS-1116718 awarded by the National Science Foundation. The invention was made with government support under Grant Number N00014-10-1-10989 awarded by the Department of Defense: Office of Naval Research. The government has certain rights in the invention.

BACKGROUND

Cameras may include a lens and an imaging sensor. The lens may direct light from a scene onto the image sensor. The image sensor may convert the light captured by the lens into electrical signals. The scene may be reconstructed based on the electrical signals generated by the image sensor and the optical properties of the lens.

SUMMARY

In one aspect, a lens-free imaging system for generating an image of a scene in accordance with one or more embodiments of the invention includes an electromagnetic (EM) radiation sensor; a mask disposed between the EM radiation sensor and the scene; and an image processor that obtains signals from the EM radiation sensor while the EM radiation sensor is exposed to the scene and estimates the image of the scene based on, at least in part, the signals and a transfer function between the scene and the EM radiation sensor.

In one aspect, a method of generating an image using a lens-free imaging system in accordance with one or more embodiments of the invention includes obtaining a transfer matrix that relates electrical signals generated by an image sensor when exposed to electromagnetic (EM) radiation from a scene to an image of a scene; and generating an image of a scene based on the transfer matrix and the electrical signals generated by the image sensor when exposed to the scene.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
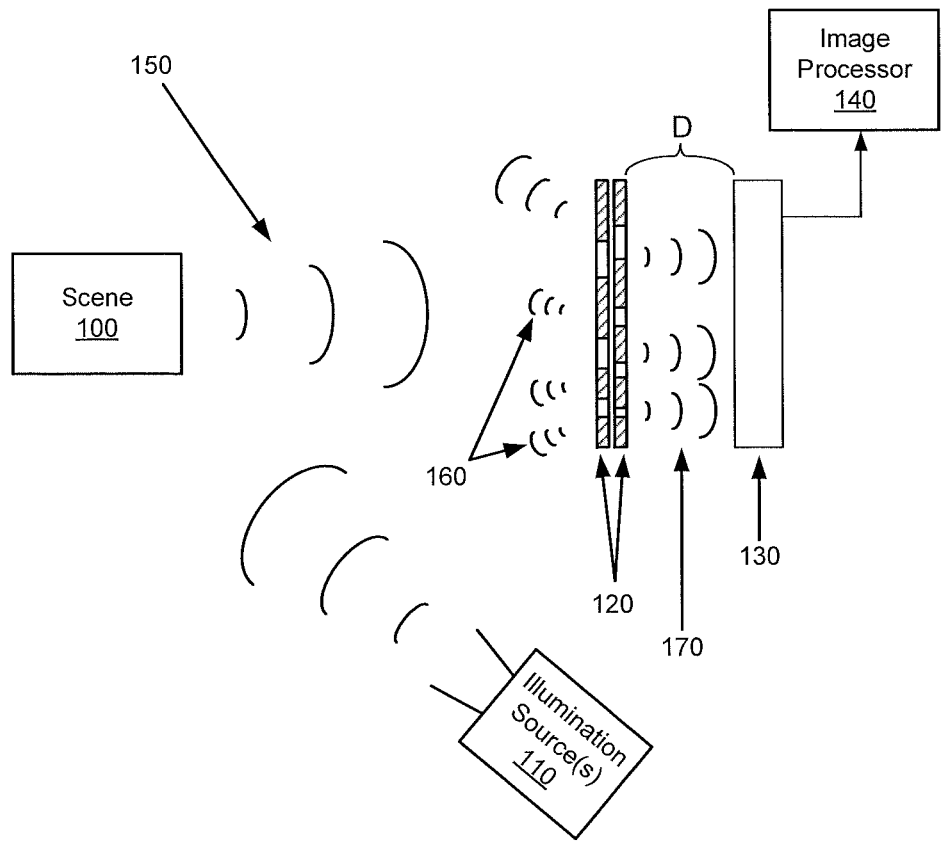
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

Embodiments of the invention relate to lens-less imaging systems, lens-less imaging sensors, and methods of operating lens-less imaging systems. A lens-less imaging system may generate electrical signals in response to receiving electromagnetic (EM) radiation. The electrical signals generated by the lens-less imaging system may be processed by an image processor to generate an image of a scene from which the electromagnetic energy was scattered.

In one or more embodiments of the invention, a lens-less imaging system may include an electromagnetic radiation sensor, one or more masks, and an image processor. The electromagnetic radiation sensor may generate electronic signal in response to receiving electromagnetic radiation. The electromagnetic radiation sensor may be, for example, a charge capture device (CCD) that responds to EM radiation. In one or more embodiments of the invention, the electromagnetic radiation may be visible light, short-wave infrared light, mid-wave infrared light, long-wave infrared light, terahertz, millimeter wave, wireless or other parts of the electromagnetic spectrum.

Each of the masks may be a planar structure disposed between the EM sensor and a scene. In one or more embodiments of the invention, the masks may include regions that are opaque and other regions that are transparent to EM radiation. The opaque and transparent regions may cause EM radiation that is incident on the mask to be partially reflected away from the EM radiation sensor and partially transmitted to the EM radiation sensor.

In one or more embodiments of the invention, the masks may include regions that have a different refractive indices or thickness of transparent materials. The different regions having different refractive indices or thickness may generate amplitude and phase module of incident EM radiation.

EM radiation that is transmitted to the EM radiation sensor may be diffracted and/or amplitude/phase modulated when compared to EM radiation that is incident on the masks.

In one or more embodiments of the invention, the mask may be disposed at a predetermined distance from the EM radiation sensor. The predetermined distance may be, for example, 0.5 mm. In one or more embodiments of the invention, the predetermined distance may be 0 mm, e.g., disposed directly on the EM radiation sensor. In one or more embodiments of the invention, the ratio of the distance between the EM radiation sensor and the mask divided by the width of the EM radiation sensor may be less than 0.1. In one or more embodiments of the invention, the ratio of the distance between the EM radiation sensor and the mask divided by the width of the EM radiation sensor may be less than 0.25. In one or more embodiments of the invention, the ratio of the distance between the EM radiation sensor and the mask divided by the width of the EM radiation sensor may be less than 0.5. In one or more embodiments of the invention, the ratio of the distance between the EM radiation sensor and the mask divided by the width of the EM radiation sensor may be less than 0.3.

In one or more embodiments of the invention, the image processor may generate an image of a scene based on the electronic signals received from the EM radiation sensor. The image processor may be, for example, a digital signal processor (DSP).

Additional embodiments of the invention may relate to a method of operating a lens-less imaging system. The method may include displaying a number of test patterns to the lens-less imaging system and determining a transfer function between EM radiation that is radiated by a scene and electrical signals produced by an EM radiation sensor of the lens-less imaging system.

FIG. 1 shows a lens-less imaging system in accordance with one or more embodiments of the invention. The system may be configured to generate an image of a scene (100). The system may include an EM radiation sensor (130), one or more masks (120), an illumination source (110), and an image processor (140). Each of the aforementioned components of the system are described below.

The system may include an EM radiation sensor (130). The EM radiation sensor (130) may be a physical device that generates electrical signals in response to incident EM radiation.

Figure 2:
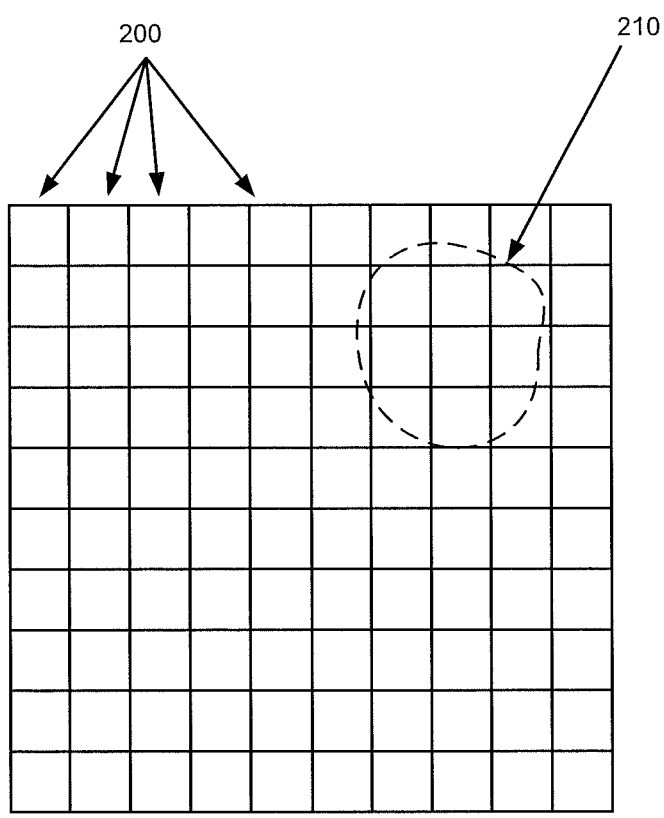
FIG. 2 shows a diagram of an electromagnetic radiation sensor in accordance with one or more embodiments of the invention.

FIG. 2 shows an example of an EM radiation sensor in accordance with one or more embodiments of the invention. The EM radiation sensor (130) may include a number of sensing regions (200) that each generate electrical signals in response to EM radiation incident on each region. For example, EM radiation may be incident on a first EM sensing region and a second EM sensing region. The first EM sensing region may produce a first electrical signal and the second EM sensing region may produce a second electrical signal Each of the signals may be proportional to a magnitude and/or frequency of the EM radiation that is incident on each EM sensing region. In one or more embodiments of the invention, the EM radiation sensor may be a charge-coupled device (CCD).

The sensing regions (200) of the EM radiation sensor (130) may be disposed over a two dimensional area. While the sensing regions (200) are shown as square regions in a uniform two dimensional grid, the sensing regions (200) may have other shapes and may be distributed in a uniform or irregular pattern over the surface without departing from the invention. In one or more embodiments of the invention, the two dimensional area may be a flat surface. In one or more embodiments of the invention, the two dimensional area may be a curved surface.

In one or more embodiments of the invention, the EM radiation sensor (130) may generate electrical signals in response to visible light. In one or more embodiments of the invention, the EM radiation sensor (130) may generate electrical signals in response to infrared radiation. In one or more embodiments of the invention, the EM radiation sensor (130) may generate electrical signals in response to ultraviolet light, short-wave infrared light, mid-wave infrared light, long-wave infra-red light, wireless, millimeter wave or terahertz radiation. The EM radiation sensor (130) may generate electrical signals in response to EM radiation having other spectral content without departing from the invention.

Returning to FIG. 1, the system may include one or more masks (120). The masks (120) may be a physical device that masks portions of the EM radiation sensor (130) from EM radiation that is incident on the masks (120). The masks (120) may be disposed between the scene (100) and the EM radiation sensor (130) and thereby mask portions of the EM radiation sensor (130) from EM radiation from the scene (100). The masks (120) may be disposed at a distance D away from the EM radiation sensor (130). In one or more embodiments of the invention, the distance D may be 0.5 mm or less. In one or more embodiments of the invention, the distance D may be 0 mm, e.g., the masks (120) may be disposed directly on the EM radiation sensor (130).

Figure 3:
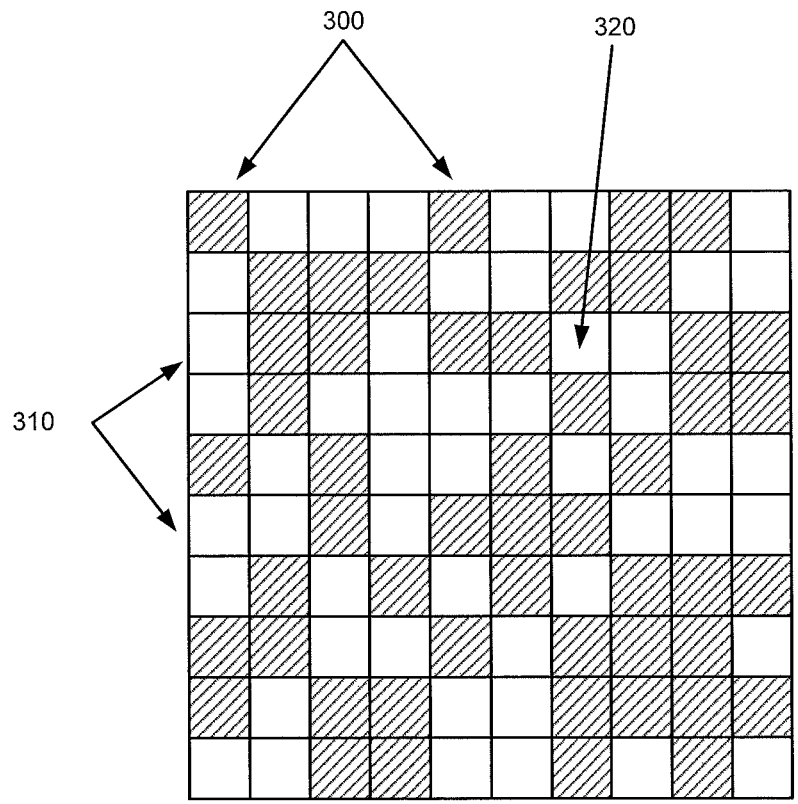
FIG. 3 shows a diagram of a mask in accordance with one or more embodiments of the invention.

FIG. 3 shows a diagram of an example of a mask of the masks (120) in accordance with one or more embodiments of the invention.

In one or more embodiments of the invention, the mask may include a first number of regions (300) that are opaque and a second number of regions (310) that are transparent. The opaque first number of regions (300) may prevent the transmission of EM radiation through the mask and the transparent second number of regions (310) may allow the transmission of EM radiation through the mask.

In one or more embodiments of the invention, opaque first number of regions (300) may be gold, aluminum, chrome, or other metals. In one or more embodiments of the invention, the transparent second number of regions (310) may be glass, quartz, or may be a void space.

In one or more embodiments of the invention, the mask may include a first number of regions (300) that have refractive indices or thicknesses that are different than the refractive indices and/or thicknesses of a second number of regions (310) that are transparent. The first number of regions (300) and the second number of regions (310) may amplitude and/or phase module EM radiation that is transmitted through the mask.

In one or more embodiments of the invention, the first number of regions (300) and the second number of regions (310) may be distributed over a two dimensional surface. Each region may be disposed adjacent to other regions. While the first number of regions (300) and second number of regions (310) are shown in FIG. 2 in a specific two dimensional pattern, the first number of regions (300) and second number of regions (310) may be distributed in other two dimensional patterns or randomly distributed without departing from the invention.

In one or more embodiments of the invention, the first number of regions (300) and second number of regions (310) are distributed across the mask in the form of an outer product of two one-dimensional binary sequences. Each of the binary sequences may have any values. Values of 1 may indicate an opaque region (300) while values of 0 may indicate a transparent region (310), or the reverse. In one or more embodiments of the invention, the two one dimensional binary sequences are pseudorandom binary sequences. In one or more embodiments of the invention, the binary sequences are maximum length sequences (M-length sequences). In one or more embodiments of the invention the binary sequences are subsets of the Hadamard sequence or the S-matrix sequence.

In one or more embodiments of the invention, there may be an equal number of first number of regions (300) and second number of regions (310). In other words, if there are 8000 first number of regions (300) there may be 8000 second number of regions (310).

In one or more embodiments of the invention, the feature size of each opaque region (300) and each transparent region (310) may be 10% of the distance between the masks (120) and the EM radiation sensor (130, FIG. 1). In one or more embodiments of the invention, the feature size of each opaque region (300) and each transparent region (310) may be 30 μm.

In one or more embodiments of the invention, each opaque region (300) and each transparent region (310) may have a square cross section. The square cross section of each region may have an edge length of the feature size of each region. In other words, a feature size of 30 μm indicates that each region is a 30 μm×30 μm square.

In one or more embodiments of the invention, the masks (120) may be disposed on a transparent support structure. The transparent support structure may be, for example, a quartz wafer.

Returning to FIG. 1, the system may include one or more illumination sources (110). The illumination sources (110) may generate EM radiation having at least a portion of a spectral content that is detectable by the EM radiation sensor (130) and illuminate the scene (100) with the generated EM radiation. The illumination sources (110) may be, for example, an incandescent source, a light emitting diode, or any other EM radiation producing device. In one or more embodiments of the invention, the illumination sources (110) may be ambient illumination.

The system may include an image processor (140). The image processor (140) may receive the electrical signals generated by the EM radiation sensor (130) and generate an image of the scene (100) based on the electrical signals.

Figure 4:
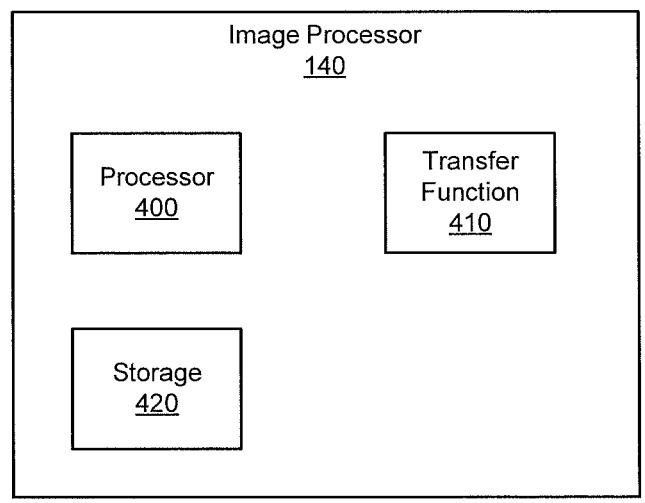
FIG. 4 shows a diagram of an image processor in accordance with one or more embodiments of the invention.

FIG. 4 shows a diagram of an image processor (140) in accordance with one or more embodiments of the invention. The image processor (140) may be configured to and/or programmed to generate images of a scene (100) based on electrical signals received from the EM radiation sensor (130). The image processor (140) may include a processor (400), transfer function (410), and storage (420). Each of the aforementioned components of the system are described below.

In one or more embodiments of the invention, the processor (400) may be a general purpose processor, embedded processor, programmable gate array, digital signal processor, or any other type of data processing device.

The storage (420) may be a non-transitory computer readable storage including instruction that, when executed by the processor (400), cause the image processor (140) to perform the functionality shown in FIGS. 5 and 6, and described below.

When executing the instructions stored on the storage (420), the image processor (140) may generate an image of the scene (100) based on a relationship between EM radiation scattered by the scene (100) and the electrical signals generated by the EM radiation sensor (130). When EM radiation interacts with the scene (100), it may be scattered. A portion of the scattered EM radiation may be scattered toward the system as scene EM radiation (150), as seen in FIG. 1.

When scene EM radiation (150) is incident on the system, the masks (120) may scatter some of the scene EM radiation (150) as reflected EM radiation (160) and may scatter some of the scene EM radiation (150) as transmitted radiation (170). The reflected EM radiation (160) does not interact with the EM radiation sensor (130) while the transmitted EM radiation (170) interacts with the EM radiation sensor (130), e.g., causes the EM radiation sensor (130) to generate electrical signals. The transmitted EM radiation (170) may be modulated and diffracted by the masks (120) when compared to the scene EM radiation (150). Modulating and diffracting the transmitted EM radiation (170) may multiplex the transmitted radiation onto a number of sensing regions of the EM radiation sensor.

For example, a first transparent region (320) is shown in FIG. 3. A portion of the EM radiation that interacts with the first transparent region (320) may be scattered onto a number of sensing regions (210) of the EM radiation sensor as illustrated by the area with a dashed outline shown in FIG. 2. Each of the number of sensing regions (210) may receive a portion of the EM radiation scattered by the first transparent region (320, FIG. 3) and thereby generate electrical signals.

To generate an image of the scene (100), it is assumed that the scene includes a number of EM radiation sources, e.g., pixels, equal to the number of features of the masks (120). In other words, if the mask is a 100×100 feature array, it is assumed that the scene consists of 100×100 pixels.

Based on the above, the transfer function between an image of the scene and the electrical signals generated by the EM radiation sensor (130) is:

$$y = \phi x + e \quad \text{Equation (1)}$$

where x is a matrix of the pixelated image of the scene, y is a matrix of the electrical signals generated by the EM radiation sensor (130), $\Phi$ is the transfer matrix, and e is the error due to system noise and other factors. In one or more embodiments of the invention, the incident field is coherent and is represented as a complex-valued field or vector. In one or more embodiments of the invention, the incident field is incoherent and is represented as a real-valued field or vector.

The image of the scene may be determined by inverting equation (1), assuming the transfer matrix is known. For example, the image of the scene may be determined by recording the electrical signals of the EM radiation sensor (130) when the system is exposed to scene EM radiation (150). Equation (1) may be inverted using any method such as a least-squares problem or other regularized least-squares problem.

If a mask is used that is formed using two one-dimensional sequences, as described above, the transfer function between the image of the scene and the electrical signals generated by the EM radiation sensor (130) is:

$$Y = \phi_L X \phi_R^T + E \qquad \text{Equation (2)}$$

where $\Phi_L$, $\Phi_R$ are sequences that correspond to one-dimensional convolution along the rows and columns of the scene, X is a matrix of the pixelated image of the scene, y is a matrix of the electrical signals generated by the EM radiation sensor (130), and E is the error due to system noise and other factors.

In one or more embodiments of the invention, the transfer matrix may be determined by modeling of the modulation and diffraction of EM radiation due to the masks (120). For example, the masks (120) may be modeled computationally to determine how light from a scene (100) is distributed onto the EM radiation sensor and thereby determine the transfer function.

Figure 5:
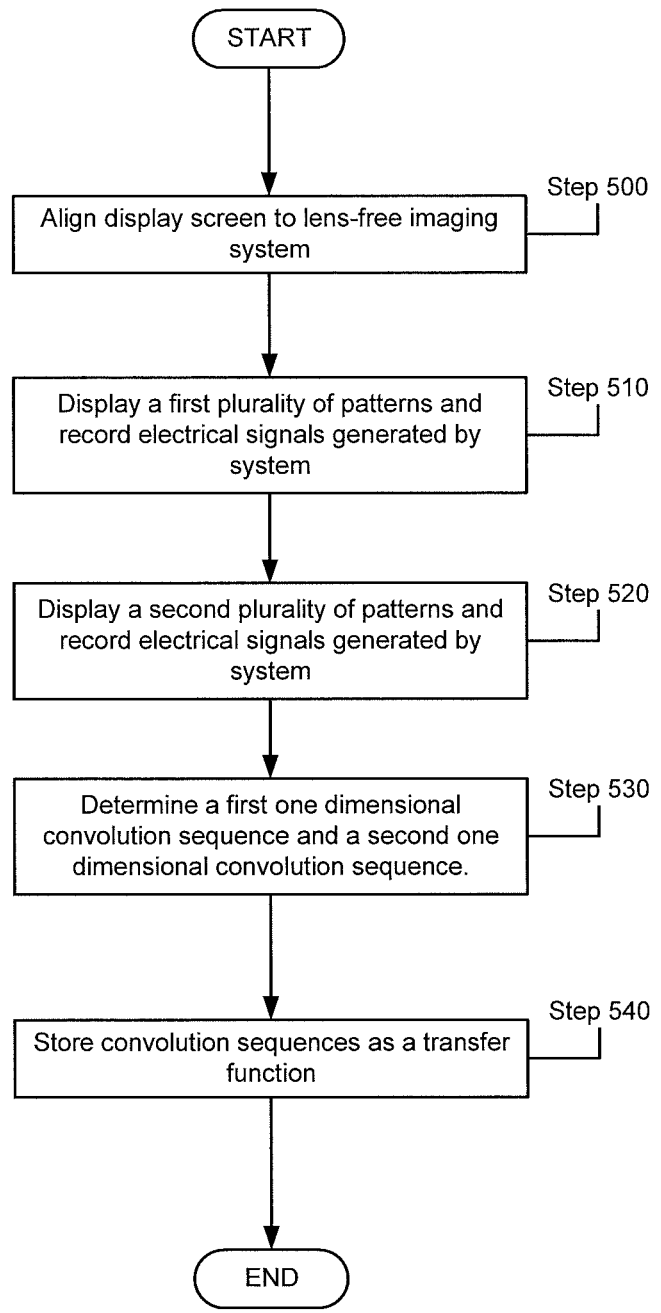
FIG. 5 shows a flowchart of a method of calibrating a lens-free imaging system in accordance with embodiments of the invention.

In one or more embodiments of the invention, the transfer matrix may be determined by the method shown in FIG. 5.

FIG. 5 shows a flowchart of a method in accordance with one or more embodiments of the invention. The method depicted in FIG. 5 may be used to a transfer function of a lens-free imaging device in accordance with one or more embodiments of the invention. One or more steps shown in FIG. 5 may be omitted, repeated, and/or performed in a different order among different embodiments.

In Step 500, a display screen is aligned to the lens-free imaging system. The display screen may be, for example, a liquid crystal display. Other types of display may be used without departing from the invention. In one or more embodiments of the invention a physical light source, such as a point or a line, may be spatially translated to calibrate the transfer matrix.

In one or more embodiments of the invention, the display screen may be aligned to the lens-free imaging system by displaying a test pattern on the display while recording electrical signals from an EM radiation sensor of the lens-free imaging system. The display pattern may be, for example, a cross-hairs pattern or point pattern. The recorded electrical signals may indicate the degree of alignment between the display and the EM radiation sensor. The position of the display and lens-free imaging system may be manually adjusted to improve alignment.

In Step 510, a first plurality of patterns may be displayed on the display. During the display of each test pattern, electrical signals generated by the EM radiation sensor may be recorded and stored. In one or more embodiments of the invention, the plurality of images may be obtained by physically translating a fixed illumination pattern such as a line or a point light source.

In one or more embodiments of the invention, each pattern of the first plurality of patterns displayed may be a unique Hadamard pattern, unique line patterns, or unique dot patterns.

In one or more embodiments of the invention, the number of patterns of the first plurality of patterns may be equal to the number of regions across a width of a mask of the lens-free imaging system.

In Step 520, a second plurality of patterns may be displayed on the display. During the display of each test pattern, electrical signals generated by the EM radiation sensor may be recorded and stored.

In one or more embodiments of the invention, each pattern of the second plurality of patterns displayed may be a unique Hadamard pattern. In other words, all of the patterns of the first plurality of patterns and second plurality of patterns may be unique Hadamard patterns. By utilizing unique patterns, an over determined system of linear relationship may be generated.

In one or more embodiments of the invention, the number of patterns of the first plurality of patterns may be equal to the number of regions across a height of a mask of the lens-free imaging system.

Thus, during steps 510 and 520, a total of 2N patterns may be displayed where N is the number of regions across a width or height of a mask.

In Step 530, a first one-dimensional convolution sequences and a second one-dimensional convolution sequence are determined. The one dimensional convolutions sequences may correspond to the $\Phi_L$, $\Phi_R$ sequences. The one dimensional convolution sequences may be found by, for example, computing the truncated singular value decomposition of:

$$Y = (\phi_L a)(\phi_R b)^T \qquad \text{Equation (3)}$$

In Step 540, the first one-dimensional convolution sequence and the second one-dimensional convolution sequence are stored.

Each of the aforementioned stored sequences may be used to calculate a scene image.

Figure 6:
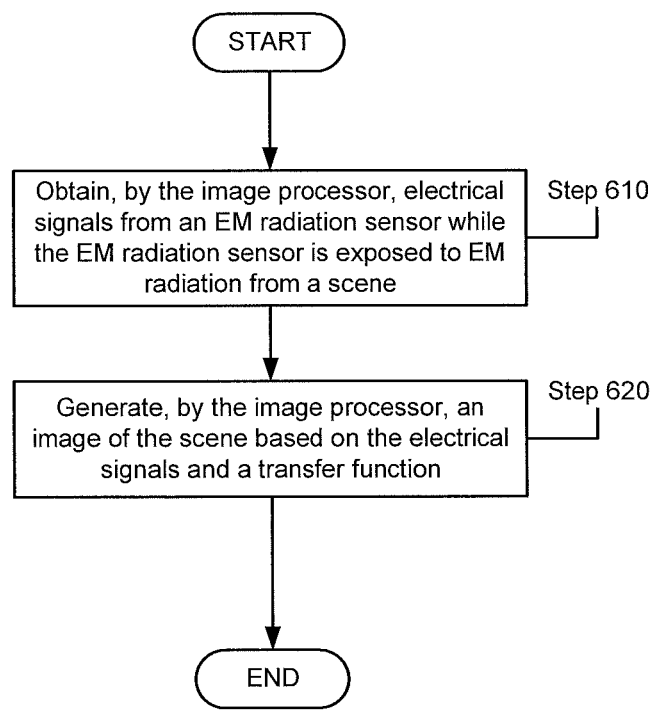
FIG. 6 shows a flowchart of a generating an image using a lens-free imaging system in accordance with embodiments of the invention.

FIG. 6 shows a flowchart of a method in accordance with one or more embodiments of the invention. The method depicted in FIG. 6 may be used to generate an image of a scene using a lens-free imaging device in accordance with one or more embodiments of the invention. One or more steps shown in FIG. 6 may be omitted, repeated, and/or performed in a different order among different embodiments.

In Step 600, electrical signals from an EM radiation sensor are obtained by an image processor while the EM radiation sensor is exposed to EM radiation from a scene. For example, the EM radiation sensor may be exposed to EM radiation for 10 milliseconds.

In Step 610, the image processor generates an image of the scene based the obtained electrical signals and a transfer function. The transfer function may be stored in the image processor.

In one or more embodiments of the invention, the transfer function may be a matrix having a number of elements corresponding to the number of regions of a mask of the lens-free imaging system.

In one or more embodiments of the invention, the transfer function may be two one dimensional sequences. Each sequence may have a number of elements corresponding to the number of regions along a width or height of a mask of the lens-free imaging system.

In one or more embodiments of the invention, the image of the scene may be generated by solving the least-squares minimization problem:

$$\hat{X}_{LS} = \arg\min_X \|\phi_L X \phi_R^T - Y\|_2^2 \qquad \text{Equation (4)}$$

The least-squares minimization problem may be solved in any way without departing from the invention.

In one or more embodiments of the invention, the image of the scene may be generated by solving the regularized least-squares minimization problem:

$$\hat{X}_{LS} = \arg\min_X (\|\phi_L X \phi_R^T - Y\|_2^2 + \Theta(X)) \qquad \text{Equation (5)}$$

where $\Theta(X)$ represents a regularizer. In one or more embodiments of the invention, The regularizer is the total variation, Wavelet sparsity, L1 norm of wavelet, or other patch-based or dictionary-based regularizer. The regularizer may be other regularizers without departing from the invention.

The least-squares minimization problem may be solved in any way without departing from the invention.

Once solved, the image of the scene $\hat{X}_{LS}$ may be stored in the image processor and/or displayed and/or stored. For example, the image of the scene may be stored in the storage of the image processor.

While the above description of generating an image of a scene has been for single images, embodiments of the invention may include generating a number of images using the above method at different points in time to generate a video. In one or more embodiments of the invention, an image of a scene at a first point in time may be used to improve the speed of reconstruction of a second image scene at a second point in time. For example, there may be little difference between images of a scene at different points in time that are temporally separated by small amounts, e.g., fractions of a second. An image of a scene at a first time that is temporally separated from an image as a scene at a second time may substantially reduce the computation power and time required to solve either equation 4 or equation 5 when compared to generating an image of a scene without a previously generated image of the scene.

The following are explanatory examples of lens-free camera systems in accordance with one or more embodiments of the invention.

Example 1

A first example of a lens-free camera system includes a 1036×1048 pixel color EM radiation sensor. Each pixel of the EM radiation sensor may be 6.45 μm wide. The EM radiation sensor may have a size of 6.7 mm×8.9 mm.

The first example also includes a mask formed from a fused quartz plate with a chrome metallization layer. The chrome metallization layer may include a two dimensional patter of opaque regions, e.g., metal areas, and transparent regions, e.g., void regions.

The pattern of the mask consisted of 510×510 regions. Each region had a feature size of 30 μm, e.g., square boxes each having an edge length of 30 μm.

Figure 7A:
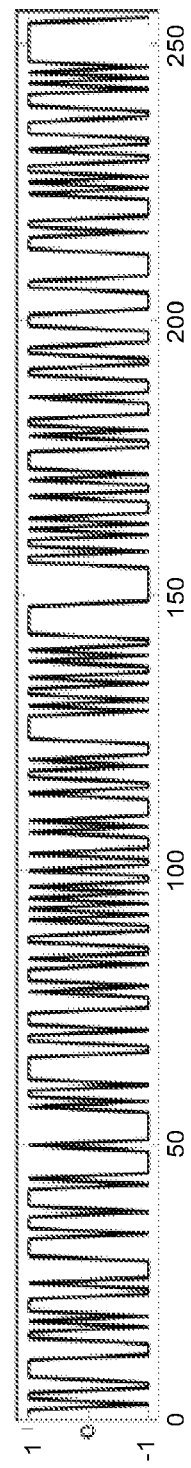
FIG. 7A shows an example of a first maximum length sequence in accordance with embodiments of the invention.

To generate the pattern, a maximum length sequence of length 255 was generated. The sequence was repeated twice to generate all 510 elements. The M-sequence is shown in FIG. 7A. The initial pattern was generated with values of either +1 or −1. To make a realizable mask, values of −1 were replaced with values of 0.

Figure 7B:
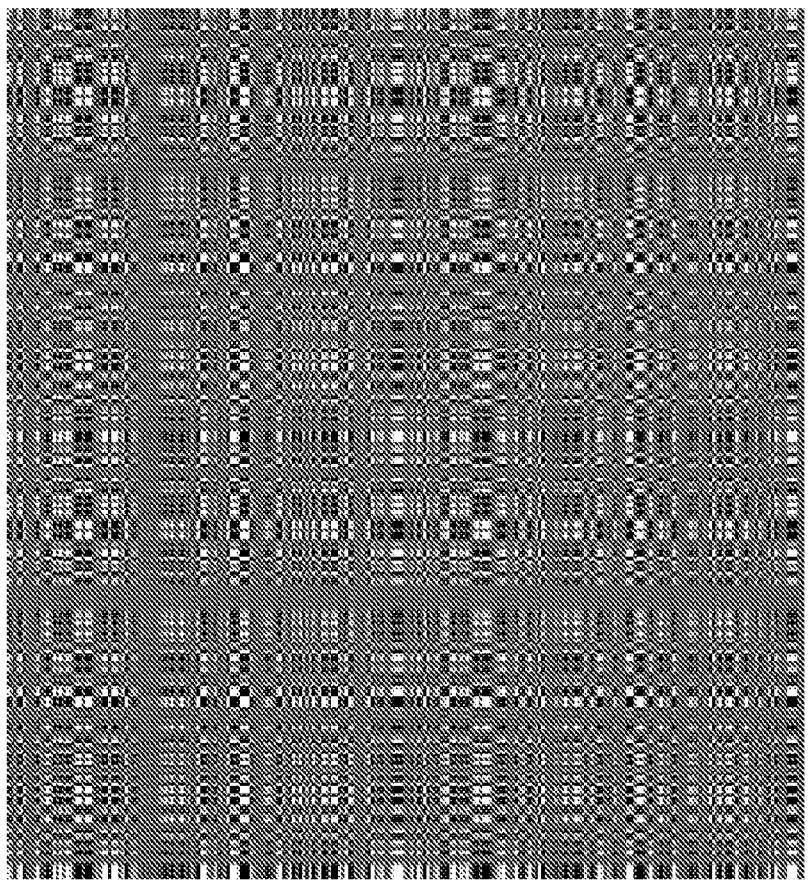
FIG. 7B shows an example of a matrix based on the first maximum length sequence in accordance with embodiments of the invention.
Figure 7C:
FIG. 7C shows an example of an image of a scene generated by a lens-free imaging system in accordance with embodiments of the invention.
Figure 7D:
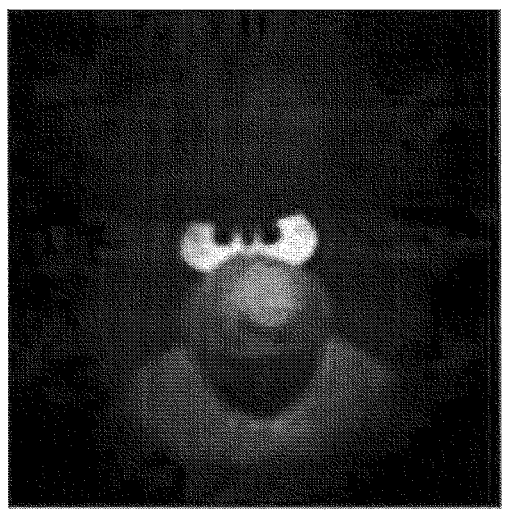
FIG. 7D shows an example of an image of a scene generated by a lens-free imaging system in accordance with embodiments of the invention.
Figure 7E:
FIG. 7E shows an example of an image of a scene generated by a lens-free imaging system in accordance with embodiments of the invention.
Figure 7F:
FIG. 7F shows an example of an image of a scene generated by a lens-free imaging system in accordance with embodiments of the invention.

An outer product of the M-sequence was generated to form a matrix. The matrix is shown in FIG. 7B. Dark regions indicate a value of 1 while light regions indicate a value of 0.

The chrome metallization layer on the fused quartz plate was patterned according to the matrix shown in FIG. 7B and thereby formed the mask.

To form the lens-free imaging system, the mask was placed 0.5 mm away from the color EM radiation sensor. Once formed, images of scenes were taken with an average exposure time of 10 milliseconds. Electrical signals from the EM radiation sensor were recorded while exposed to the scene. Images generated from the scene utilizing the methods shown in FIGS. 5 and 6. Due to the difference between resolution of the EM radiation sensor and the number of pixels of the mask, the raw data from the EM radiation sensor was sampled to generate electrical signal data corresponding to the same number of pixels of the mask, e.g., 510×510.

FIGS. 7C-7F show example of images generated by the lens-free camera system. While the images here are shown in black and white, the lens-free camera system generates full color images.

Example 2

A second example of a lens-free camera system includes a short wave infrared EM radiation sensor having a resolution of 256×300 pixels. Each pixel of the EM radiation sensor may be 25 μm wide.

The second example also includes a mask formed from a fused quartz plate with a chrome metallization layer. The chrome metallization layer may include a two dimensional patter of opaque regions, e.g., metal areas, and transparent regions, e.g., void regions.

The pattern of the mask consisted of 64×64 regions. Each region had a feature size of 100 μm, e.g., square boxes each having an edge length of 100 μm.

Figure 8A:
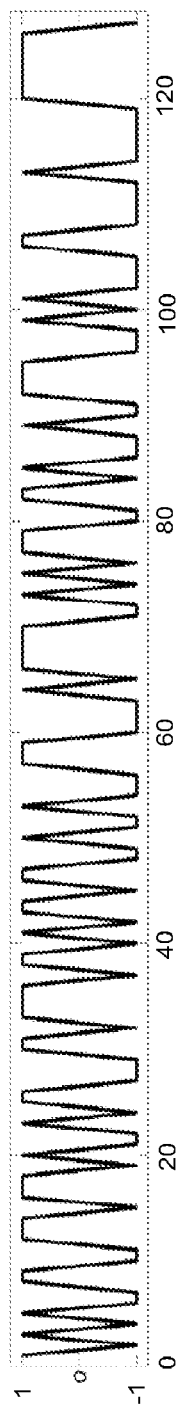
FIG. 8A shows an example of a second maximum length sequence in accordance with embodiments of the invention.

To generate the pattern, a maximum length sequence of length 127 was generated. The M-sequence is shown in FIG. 8A. The initial pattern was generated with values of either +1 or −1. To make a realizable mask, values of −1 were replaced with values of 0.

Figure 8B:
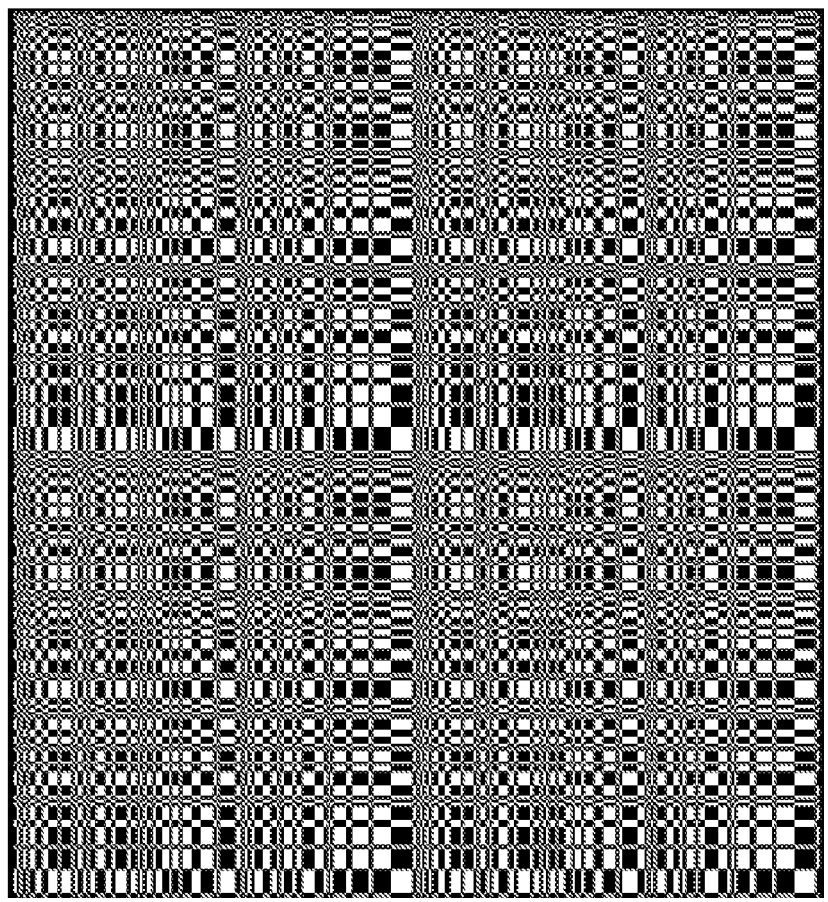
FIG. 8B shows an example of a matrix based on the second maximum length sequence in accordance with embodiments of the invention.

An outer product of the M-sequence was generated to form a matrix. The matrix is shown in FIG. 8B. Dark regions indicate a value of 1 while light regions indicate a value of 0.

The chrome metallization layer on the fused quartz plate was patterned according to the matrix shown in FIG. 8B and thereby formed the mask.

To form the lens-free imaging system, the mask was placed 5 mm away from the color EM radiation sensor. Once formed, images of scenes were taken with an average exposure time of 10 milliseconds. Electrical signals from the EM radiation sensor were recorded while exposed to the scene. Images generated from the scene utilizing the methods shown in FIGS. 5 and 6. Due to the difference between resolution of the EM radiation sensor and the number of pixels of the mask, the raw data from the EM radiation sensor was sampled to generate electrical signal data corresponding to the same number of pixels of the mask, e.g., 64×64.

Figure 8C:
FIG. 8C shows an example of an image of a scene generated by a lens-free imaging system in accordance with embodiments of the invention.
Figure 8D:
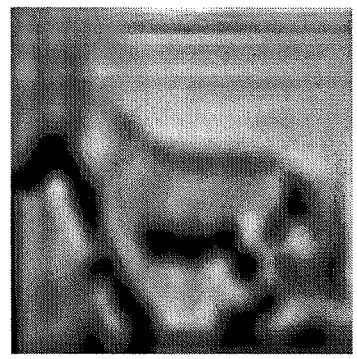
FIG. 8D shows an example of an image of a scene generated by a lens-free imaging system in accordance with embodiments of the invention.
Figure 8E:
FIG. 8E shows an example of an image of a scene generated by a lens-free imaging system in accordance with embodiments of the invention.

FIGS. 8C-8E show example of images generated by the show wave infrared lens-free camera system. Each image consists of 64×64 pixels.

One or more embodiments of the invention may provide one or more of the following advantages: (i) A system in accordance with embodiments of the invention may have a thickness-to-width ration of less than 0.1, (ii) the system may have a very high light collection ability, (iii) the system may be much less expensive to produce when compared to an imaging system that integrates a lens, and (iv) the system may be much simpler to produce when compared to lens based imaging systems.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A lens-free imaging system for generating an image of a scene, comprising:
   an electromagnetic (EM) radiation sensor that senses visible light, short-wave infrared light, mid-wave infrared light, long-wave infrared light, terahertz, millimeter wave, or wireless;
   only one mask that is disposed between the EM radiation sensor and the scene; and
   an image processor configured to:
      obtain signals from the EM radiation sensor while the EM radiation sensor is exposed to the scene, and
      estimate the image of the scene based on, at least in part, the signals and a transfer function between the scene and the EM radiation sensor,
   wherein the mask is disposed at a distance less than 0.5 times a width of the EM radiation sensor from the EM radiation sensor and is fixed, static, and non-dynamic,
   wherein the mask comprises a first plurality of regions and a second plurality of regions,
   wherein a distribution of the first plurality of regions and the second plurality of regions is based on a convolution of a first one dimensional sequence and a second one dimensional sequence.

2. The system of claim 1, wherein:
   the first plurality of regions are opaque to EM radiation; and
   the second plurality of regions are transparent to EM radiation.

3. The system of claim 1, wherein the mask comprises:
   a first plurality of regions comprising a material having a first refractive index; and
   a second plurality of regions comprising a second material having a second refractive index,
   wherein the first refractive index is different than the second refractive index.

4. The system of claim 2, wherein the first plurality of regions and second plurality of regions are disposed on a two dimensional surface.

5. The system of claim 4, wherein the two dimensional surface is curved, wherein the EM radiation sensor is curved.

6. The system of claim 2, wherein there are a first number of regions of the first plurality of regions and a second number of regions of the second plurality of regions.

7. The system of claim 6, wherein the first number and second number are the same.

8. The system of claim 1, where in the regions of the first plurality of regions and the regions of the second plurality of regions are distributed randomly across the mask.

9. The system of claim 1, wherein the first one dimensional sequence and the second one dimensional sequence are random sequences.

10. The system of claim 1, wherein the first one dimensional sequence is a maximum length sequence and the second one dimensional pattern is a second maximum length sequence.

11. The system of claim 10, wherein the maximum length sequence and the second maximum length sequence are the same.

12. The system of claim 1, wherein the transfer function comprises a first binary sequence and a second binary sequence.

13. The system of claim 12, wherein the first binary sequence has a number of entries equal to the number of regions across a width of the mask.

14. The system of claim 1, wherein the mask is disposed directly on the EM radiation sensor.

15. The system of claim 1, wherein the mask is disposed at a distance greater than zero from the EM radiation sensor.

16. A method of generating an image using a lens-free imaging system comprising:
   an electromagnetic (EM) radiation sensor that senses visible light, short-wave infrared light, mid-wave infrared light, long-wave infrared light, terahertz, millimeter wave, or wireless;
   only one mask that is disposed between the EM radiation sensor and a scene; and
   an image processor configured to:
      obtain signals from the EM radiation sensor while the EM radiation sensor is exposed to the scene, and
      estimate the image of the scene based on, at least in part, the signals and a transfer function between the scene and the EM radiation sensor,
   wherein the mask is disposed at a distance less than 0.5 times a width of the EM radiation sensor from the EM radiation sensor and is fixed, static, and non-dynamic,
   wherein the mask comprises a first plurality of regions and a second plurality of regions,
   wherein a distribution of the first plurality of regions and the second plurality of regions is based on a convolution of a first one dimensional sequence and a second one dimensional sequence;
the method comprising:
   obtaining, by the lens-free imaging system, a transfer matrix that relates electrical signals generated by the EM radiation sensor when exposed to electromagnetic (EM) radiation from the scene to the image of the scene; and
   generating, by the lens-free imaging system, the image of the scene based on the transfer matrix and the electrical signals generated by the EM radiation sensor when exposed to the scene.

17. The method of claim 16, wherein obtaining the transfer matrix comprises:
   obtaining, by the lens-free imaging system, a first plurality of electrical signals generated by the electromagnetic (EM) radiation sensor, wherein each electrical signal of the first plurality of electrical signals is generated by the EM radiation sensor while exposed to one of a plurality of patterns;
   obtaining, by the lens-free imaging system, a second plurality of electrical signals generated by the electromagnetic (EM) radiation sensor, wherein each electrical signal of the second plurality of electrical signals is generated by the EM radiation sensor while exposed to one of a second plurality of patterns;
   determining, by the lens-free imaging system, the first one dimensional convolution sequence based on the first plurality of electrical signals;
   determining, by the lens-free imaging system, the second one dimensional convolution sequence based on the second plurality of electrical signals; and
   generating, by the lens-free imaging system, the transfer matrix based on the first one dimensional convolution sequence and the second one dimensional convolution sequence.

18. The method of claim 16, wherein obtaining the transfer matrix comprises:
   simulating an electromagnetic characteristic of the mask of the lens-free imaging system; and generating, by the lens-free imaging system, the transfer matrix based on the electromagnetic characteristic of the mask.

19. The method of claim 16, wherein the image of the scene is based on, at least in part, solving a least-squares problem that relates the electrical signal and the transfer matrix.

20. The method of claim 16, wherein the image of the scene is based on, at least in part, solving a regularized least-squares problem that relates the electrical signal and the transfer matrix.

21. The method of claim 20, where the regularization is one selected from the group consisting of Total variation, Tikhonov, and Wavelet sparsity.

22. The method of claim 16, wherein each pattern of the plurality of patterns is a one-dimensional pattern.

23. The method of claim 16, wherein each pattern of the plurality of patterns is a unique Hadamard pattern.

\* \* \* \* \*